United States Patent [19]

Maeda

[11] 4,448,293
[45] May 15, 1984

[54] PRESSURE-RESPONSIVE CONTROL FOR A POWER TRAIN OF THE TYPE HAVING A TORQUE CONVERTER EQUIPPED WITH A LOCKUP CLUTCH

[75] Inventor: Fujio Maeda, Komatsu, Japan

[73] Assignee: Kabushiki Kaisha Komatsu Seisakusho, Tokyo, Japan

[21] Appl. No.: 350,348

[22] Filed: Feb. 19, 1982

[51] Int. Cl.³ ............................................. F16D 33/00
[52] U.S. Cl. ................................ 192/3.3; 192/3.31; 192/3.57; 137/102
[58] Field of Search ................... 192/3.27, 3.28, 3.29, 192/3.3, 3.57, 3.31, 3.58, 109 D; 137/102; 74/731, 732

[56] References Cited

U.S. PATENT DOCUMENTS

| | | | |
|---|---|---|---|
| 3,638,771 | 2/1972 | Chana | 192/3.33 |
| 3,820,417 | 6/1974 | Allen et al. | 192/3.3 |
| 3,834,837 | 9/1974 | Nickell | 137/102 |
| 3,991,865 | 11/1976 | Komatsu | |
| 4,349,088 | 9/1982 | Ito et al. | 192/3.3 |

Primary Examiner—George H. Krizmanich
Assistant Examiner—M. Manley
Attorney, Agent, or Firm—Armstrong, Nikaido, Marmelstein & Kubovcik

[57] ABSTRACT

A vehicle power train of the type including a torque converter for coupling an internal combustion engine to a transmission, and a hydraulically actuated lockup clutch for bypassing the torque converter and mechanically coupling the engine to the transmission. The transmission is of the type having a plurality of hydraulically actuated shift clutches for selecting a desired speed ratio and a desired direction of vehicle travel. During each shift of the transmission a pressure control valve arrangement acts to temporarily drop and then gradually increase the pressurized fluid delivered to the transmission and to the lockup clutch. Interposed between the pressure control valve arrangement and the lockup clutch, a delay valve automatically closes to place the lockup clutch in communication with a fluid drain when the output pressure of the pressure control valve arrangement drops upon shifting of the transmission, and reopens when the output pressure rises to a predetermined level. Thus is the lockup clutch disengaged at the time of each shift of the transmission and reengaged only after engagement of the selected transmission shift clutch.

4 Claims, 4 Drawing Figures

PRESSURE-RESPONSIVE CONTROL FOR A POWER TRAIN OF THE TYPE HAVING A TORQUE CONVERTER EQUIPPED WITH A LOCKUP CLUTCH

BACKGROUND OF THE INVENTION

This invention relates to power trains in general and, in particular, to a vehicle power train of the type having a torque converter equipped with a lockup clutch, and a transmission having a plurality of shift clutches for selecting a desired speed setting and a desired traveling direction. More particularly the invention pertains to a hydraulic system for controlling the operation of the lockup clutch in such a power train. The power train with the control system of this invention has particular utility in conjunction with some off-highway self-propelled work machines.

In some vehicle power trains of the type under consideration the lockup clutch is hydraulically engaged and disengaged under control by the vehicle operator. When engaged, the lockup clutch changes the power train from hydrodynamic to mechanical drive, bypassing the torque converter and mechanically coupling the vehicle engine to the transmission. A problem arises if, with the lockup clutch held engaged, the transmission is shifted to a different speed setting by actuation of one of the shift clutches. Since then the transmission is in direct mechanical connection with the engine, its shifting gives rise to a violent shock and causes sudden exertion of great torque on the engaged shift clutch, thus inviting rapid wear of the shift clutches.

SUMMARY OF THE INVENTION

The present invention seeks to eliminate the shocks of shifting and avoid the rapid wear of transmission shift clutches in power trains of the type defined.

Stated in brief, the power train to be improved by the invention is of the type including a torque converter for coupling a prime mover to a transmission having a plurality of hydraulically actuated shift clutches thereby to be conditioned for operation in a selected speed setting and in a selected direction, a hydraulically actuated lockup clutch for bypassing the torque converter and mechanically coupling the prime mover to the transmission, and pressure control means for temporarily dropping and then gradually increasing the hydraulic fluid pressure to the transmission shift clutches and to the lockup clutch during each shift of the transmission. The invention particularly concerns a hydraulic control system for the power train of the above outlined type, featuring a pressure-responsive delay valve interposed between the pressure control means and the lockup clutch. The delay valve places the lockup clutch in communication with a fluid drain when the output pressure of the pressure control means drops upon shifting of the transmission, and with the pressure control means when the output pressure thereof rises subsequently to a prescribed level.

Thus, even if the lockup clutch has been in engagement to condition the power train for mechanical drive at the time of a shifting of the transmission, the delay valve functions to cause disengagement of the lockup clutch immediately upon shifting of the transmission. Only after engagement of the newly selected shift clutch is the lockup clutch reengaged to reestablish mechanical drive through the power train. Consequently, since the output torque of the prime mover flows hydrodynamically to the transmission whenever it is being shifted, the conventional problems of violent shift shocks and rapid wear of the shift clutches are overcome and completely so because the lockup clutch is reengaged with some delay after engagement of the selected shift clutch.

The above and other features and advantages of this invention and the manner of attaining them will become more apparent, and the invention itself will best be understood, from a study of the following description of a preferred embodiment taken together with the attached drawings.

DESCRIPTION OF THE PREFERRED EMBODIMENT

Figure 1:
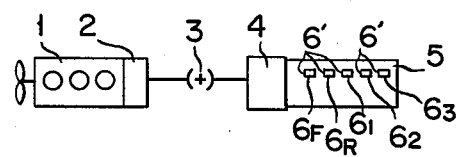
FIG. 1 is a schematic representation of a typical vehicle power train to which the present invention is applicable.

The invention will now be described in detail as adapted specifically for a power train used in self-propelled cranes intended for use on unimproved surfaces. FIG. 1 shows such a power train, comprising an internal combustion engine 1 having a damper 2 and coupled via a universal joint 3 to a torque converter 4. This torque converter is coupled to, or forms a part of, a transmission 5 and thence to ground engaging means, not shown, of the vehicle. The torque converter 4 is conventionally associated with a lockup clutch, seen at 15 in FIG. 2, of the hydraulically actuated type. The output torque of the engine 1 flows hydrodynamically through the torque converter 4 to the transmission 5 when the lockup clutch 15 is unengaged. With the lockup clutch engaged to bypass the torque converter, however, the engine output torque is conveyed to the transmission by mechanical means only The transmission 5 is of the known hydraulically actuated type, having a plurality of shift clutches which are schematically illustrated in FIG. 1 and sequentially referenced $6_F$, $6_R$, $6_1$, $6_2$ and $6_3$. The clutch $6_F$ is intended to condition the transmission for forward travel, and the clutch $6_R$ for reverse travel. The other three shift clutches, $6_1$, $6_2$ and $6_3$, are intended for first, second and third speed settings or ratios respectively. Thus the exemplified transmission 5 provides three speeds forward and three speeds reverse. Each shift clutch becomes engaged upon delivery of pressurized hydraulic fluid to its actuating fluid chamber 6', conditioning the transmission for operation in a selected speed setting or in a selected direction.

The general organization of the power train as so far described is conventional, and therein lies no feature of the present invention. The novel features of the invention will appear in the following discussion of the hydraulic control system for the power train, with reference had to FIGS. 2 to 4.

Figure 2:
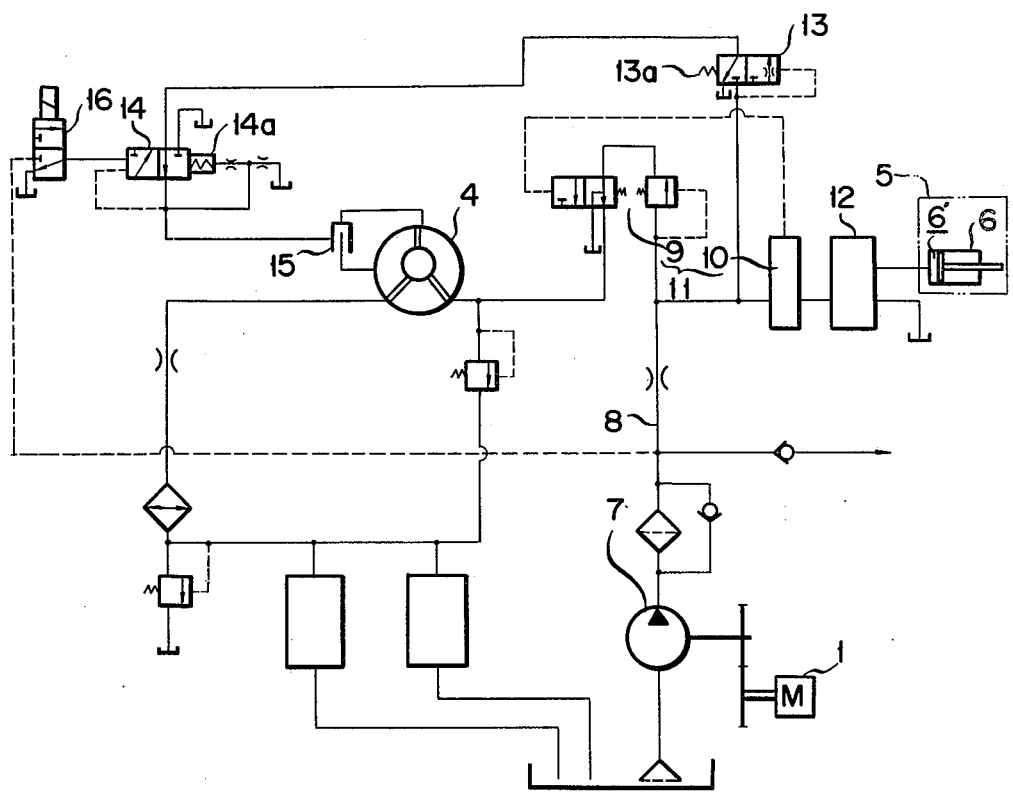
FIG. 2 is a schematic representation, partly in block diagrammatic form, of the hydraulic control system in accordance with the invention as adapted for the power train of FIG. 1.

FIG. 2 schematically illustrates the hydraulic control system, showing the vehicle engine 1, the torque converter 4 with the lockup clutch 15, and the transmission 5. Although the transmission is shown to have but one shift clutch 6, or its actuator with the fluid chamber 6', this should be understood to represent all the clutches $6_F$, $6_R$, $6_1$, $6_2$ and $6_3$ set forth in connection with FIG. 1.

Driven by the engine 1, a pump 7 delivers pressurized hydraulic fluid to gradual pressure rise valve means 9 and a quick return valve 10 by way of a conduit 8. The gradual pressure rise valve means 9 and the quick return valve 10 form in combination a pressure control valve arrangement, generally designated 11, which functions in the manner to be explained subsequently. The pressure control valve arrangement 11 communicates, on one hand, with a control valve 12 for selective delivery of the pressurized fluid to the actuating fluid chambers 6' of the transmission shift clutches 6 and, on the other hand, with a delay valve 13 constituting an essential part of the control system in accordance with the invention.

Figure 3:
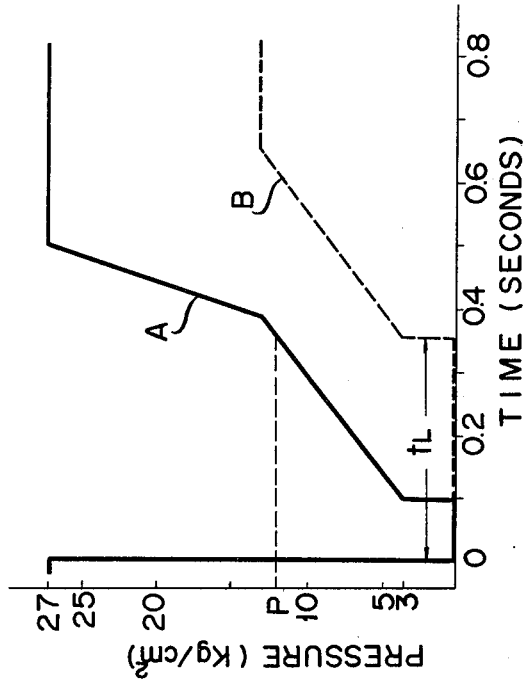
FIG. 3 is a graph explanatory of the performance of the hydraulic control system of FIG. 2.

Referring momentarily to the graph of FIG. 3 in order to explain the operation of the pressure control valve arrangement 11, the curve A of the graph represents the output pressure of the valve arrangement 11, for delivery to the transmission 5 via the control valve 12 and to the delay valve 13, at the time of the shifting of the transmission. It will be noted that the output pressure of the valve arrangement drops to zero immediately upon disengagement of the shift clutch that has been in engagement, and then, after a brief length of time, starts rising gradually. The pressure control valve arrangement 11 has per se been well known in the art; for further details of its construction and operation, reference is directed to Japanese Utility Model Publication No. 53-709.

With reference back to FIG. 2 the delay valve 13 communicates with a lockup clutch control valve 14 and thence with the lockup clutch 15. Under the bias of a spring 13a the delay valve 13 discommunicates the pressure control valve arrangement 11 from the lockup clutch control valve 14 when the output pressure of the valve arrangement 11 falls below a preset level P of FIG. 3. When the input pressure rises to the level P, the delay valve 13 shifts to its open position, gradually increasing its output as the input rises past the level P. The detailed construction of this delay valve will be discussed later with reference to FIG. 4.

The lockup clutch control valve 14 is shifted between its two working positions by a spring 14a, its own output pressure, and a solenoid valve 16 under control of the vehicle operator. When the solenoid valve 16 is in the illustrated position, the control valve 14 allows communication between delay valve 13 and lockup clutch 15 thereby conditioning the power train for mechanical drive. When actuated to the other position, the solenoid valve 16 shifts the lockup clutch control valve 14 to a position for communicating the lockup clutch 15 with the drain, with the result that the power train is conditioned for hydrodynamic drive. The lockup clutch control valve 14 is adapted to cause a gradual rise of its output pressure when shifted to the illustrated position.

Figure 4:
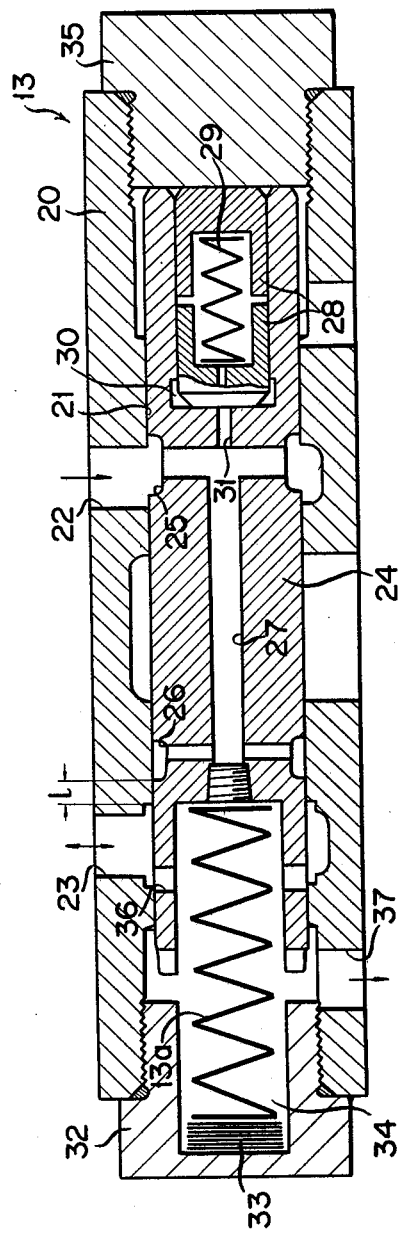
FIG. 4 is an axial sectional view showing in detail the delay valve used in the hydraulic control system of FIG. 2.

FIG. 4 is a detailed representation of the delay valve 13. It includes a housing 20 defining a bore 21 and having an inlet port 22 in communication with the pressure control valve arrangement 11, an outlet port 23 in communication with the lockup clutch control valve 14, and a drain port 37. Slidably mounted in the bore 21 is a control spool 24 having a first annular groove 25 in constant communication with the inlet port 22, and a second annular groove 26 to be placed in and out of communication with the outlet port 23. The first 25 and second 26 annular grooves communicate with each other through a passageway 27 formed axially in the control spool 24. The right hand end, as viewed in FIG. 4, of the control spool 24 is recessed or bored to provide a pressure chamber 30, in which there are slidably mounted a pair of opposed pistons pistons 28, with a compression spring 29 mounted therebetween to normally hold the pistons a slight distance away from each other. The pressure chamber 30 admits the pressurized fluid from the inlet port 22 via a passageway 31 of reduced diameter formed axially in the control spool 24.

Mounted between the left hand end of the control spool 24 and an end cap 32 of the housing 20 is the compression spring 13a urging the control spool toward the illustrated position, where it abuts against another end cap 35 of the housing. A pack of shims 33 is interposed between compression spring 13a and end cap 32 for the adjustment of the resistive force of the spring.

Such being the construction of the delay valve 13, the control spool 24 lies in the illustrated position when the valve receives substantially no pressurized fluid. In this spool position the inlet port 22 communicates with the pressure chamber 30 by way of the first annular groove 25 and axial passageway 31 in the control spool 24. The second annular groove 26 in the control spool is displaced a preassigned distance l from the outlet port 23. This outlet port communicates, instead with the drain port 37 by way of radial passageways 36 in the control spool and a spring chamber 34 accommodating the compression spring 13a.

On entering the delay valve 13 through its inlet port 22, the fluid under pressure flows through the passageway 31 into the pressure chamber 30 thereby causing leftward travel of the control spool 24 against the bias of the compression spring 13a. As the control spool travels leftwardly the preassigned distance l with the gradual increase in the input pressure, the second annular groove 26 in the control spool becomes open to the outlet port 23. The degree of the opening between second annular groove 26 and outlet port 23 increases gradually in step with the increase in the input pressure, until the second annular groove becomes fully open to the outlet port.

It is thus seen that the delay valve 13 puts out the incoming pressurized fluid with a time delay caused by the travel of the control spool 24 the distance l against the force of the compression spring 13a. The length of the time lag is adjustable by employing a suitable number of the shims 33 to vary the resistive force of the compression spring 13a against the leftward stroke of the control spool 24. It will also be seen that the pair of pistons 28 and the compression spring 29 coact as a shock absorber.

In the operation of the hydraulic control system constructed as in the foregoing, let it be assumed that the power train of FIG. 1 is now conditioned for mechanical drive as in FIG. 2, and that the transmission 5 has just been shifted. With the consequent drop in the input fluid pressure the delay valve 13 acts to disengage the lockup clutch 15 and hence to allow the engine output torque to flow hydrodynamically through the torque converter 4.

Immediately thereafter the fluid pressure in the actuating fluid chamber 6' of the selected shift clutch 6 rises as at A in the graph of FIG. 3 under the control of the pressure control valve arrangement 11 to cause engagement of the shift clutch. Only when the fluid pressure rises to the level P in FIG. 3 does the delay valve 13 shift to its open position against the bias of the spring 13a, causing a gradual increase in the fluid pressure acting on the lockup clutch 15 via its control valve 14, as represented by the curve B of FIG. 3. It will be observed from the graph that the reengagement of the lockup clutch 15 commences upon lapse of a predetermined length of time tL after the shifting of the transmission.

The foregoing will have made clear that the lockup clutch is automatically disengaged during the shifting of the transmission and is automatically reengaged after engagement of the selected shift clutch. The invention thus attains the noted objectives by use of the simple delay valve and associated means. It will of course be understood that the inventive concepts find application to power trains other than the one disclosed herein, through modifications or changes in the illustrated details without departure from the scope of the invention.

What is claimed is:

1. A hydraulic control system for a power train of the type including a torque converter for coupling a prime mover to a transmission having a plurality of hydraulically actuated shift clutches thereby to be conditioned for operation in a selected speed setting and in a selected direction, a hydraulically actuated lockup clutch for bypassing the torque converter and mechanically coupling the prime mover to the transmission, and pressure control means for temporarily dropping and then gradually increasing the hydraulic fluid pressure to the transmission and to the lockup clutch during each shift of the transmission, the control system comprising a delay valve responsive to the output pressure of the pressure control means for communicating the lockup clutch with a fluid drain when the output pressure of the pressure control means drops, and with the pressure control means when the output pressure thereof rises to a predetermined level, whereby the lockup clutch, if in engagement, becomes disengaged upon shifting of the transmission and reengaged with some delay after the engagement of a selected one of the shift clutches; the delay valve comprising a housing defining a bore and having an inlet port in communication with the pressure control means, an outlet port in communication with the lockup clutch, and a drain port in communication with the fluid drain, a control spool movable in the bore to place the outlet port in selective communication with the inlet port and with the drain port, resilient means urging the control spool toward a first position for placing the outlet port in communication with the drain port, and means defining a pressure chamber in communication with the inlet port for urging the control spool against the resilient means toward a second position for allowing communication between the inlet port and the outlet port when the output pressure of the pressure control means rises to the predetermined level.

2. A hydraulic control system as defined in claim 1, wherein the delay valve further comprises means for adjustably varying the resistive force of the resilient means against movement of the control spool from the first to the second position.

3. A hydraulic control system as defined in claim 2, wherein the resilient means is a compression spring, and wherein the adjustably varying means is a pack of shims.

4. A hydraulic control system as defined in claim 1, wherein the delay valve further comprises a pair of opposed pistons slidably mounted in the pressure chamber, and second resilient means urging the pair of pistons away from each other.

* * * * *